United States Patent
Mamun et al.

(10) Patent No.: US 12,456,855 B2
(45) Date of Patent: Oct. 28, 2025

(54) THERMALLY CONDUCTING BRACKET FOR BUSBAR TO COLD PLATE HEAT TRANSFER

(71) Applicant: GM GLOBAL TECHNOLOGY OPERATIONS LLC, Detroit, MI (US)

(72) Inventors: Abdullah-Al Mamun, Northville, MI (US); Chih-Cheng Hsu, Bloomfield Township, MI (US); Charles Hua, Novi, MI (US); Igor M. Kan, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 702 days.

(21) Appl. No.: 17/825,325

(22) Filed: May 26, 2022

(65) Prior Publication Data

US 2023/0387672 A1    Nov. 30, 2023

(51) Int. Cl.
| | |
|---|---|
| *H02G 5/10* | (2006.01) |
| *H01M 10/613* | (2014.01) |
| *H01M 10/6554* | (2014.01) |
| *H01M 50/502* | (2021.01) |

(52) U.S. Cl.
CPC ............ *H02G 5/10* (2013.01); *H01M 10/613* (2015.04); *H01M 10/6554* (2015.04); *H01M 50/502* (2021.01); *H01M 2220/20* (2013.01)

(58) Field of Classification Search
CPC .. H02G 5/10; H01M 10/613; H01M 10/6554; H01M 50/502; H01M 2220/20; H01M 10/6553; H01M 10/625; H01M 10/6551; Y02E 60/10

USPC .......................................................... 165/277
See application file for complete search history.

(56) References Cited

U.S. PATENT DOCUMENTS

| | | | | |
|---|---|---|---|---|
| 5,225,965 | A * | 7/1993 | Bailey | H01L 23/4093 174/16.3 |
| 7,952,026 | B2 * | 5/2011 | Ramsey | H02G 5/08 174/70 B |
| 10,461,517 | B1 * | 10/2019 | Vignes | H02G 5/04 |
| 10,632,848 | B2 * | 4/2020 | Lee | B60L 58/18 |

(Continued)

FOREIGN PATENT DOCUMENTS

| | | | | |
|---|---|---|---|---|
| CA | 3081042 A1 * | 11/2020 | ......... | H01M 10/425 |
| CA | 3218589 A1 * | 5/2023 | ......... | H01M 50/548 |

(Continued)

OTHER PUBLICATIONS

DE 102012215058 A1 Machine Translation (Year: 2012).*
DE102019127039A1 Machine Translation (Year: 2019).*

*Primary Examiner* — Eric S Ruppert
*Assistant Examiner* — Gustavo A Hincapie Serna
(74) *Attorney, Agent, or Firm* — Quinn IP Law

(57) ABSTRACT

A thermally conductive bracket is contemplated for use in a vehicle to facilitate transfer heat from a busbar to a cold plate, such as to assist with heat transfer to a cold plate used to act as a heat sink for a plurality of battery cells connected to the busbar. The bracket may include a thermally conductive heat transfer material shaped to receive the busbar where at least a portion of the material is configured to include opposed sides and a bottom such that the opposed sides are configured to transfer heat from the busbar to the bottom and the bottom is configured to transfer heat from the sides to the cold plate.

17 Claims, 3 Drawing Sheets

(56) References Cited

U.S. PATENT DOCUMENTS

| | | | |
|---|---|---|---|
| 10,665,848 B2* | 5/2020 | Mack | H01M 10/6557 |
| 10,720,683 B2* | 7/2020 | Obasih | H01M 10/625 |
| 11,211,727 B2* | 12/2021 | Ichikawa | H01R 12/58 |
| 11,495,384 B2* | 11/2022 | Hsieh | H01F 17/045 |
| 11,811,038 B2* | 11/2023 | Polakowski | H01M 10/443 |
| 12,090,865 B2* | 9/2024 | Bauer | H02J 7/00 |
| 2010/0051342 A1* | 3/2010 | Diaz | H02B 1/56 |
| | | | 174/68.2 |
| 2011/0132580 A1* | 6/2011 | Herrmann | H01M 8/2483 |
| | | | 165/104.33 |
| 2014/0315401 A1* | 10/2014 | Blasbalg | H02B 1/06 |
| | | | 174/149 B |
| 2014/0363711 A1* | 12/2014 | Zhao | H01M 50/569 |
| | | | 429/90 |
| 2015/0017508 A1* | 1/2015 | Khakhalev | H01M 50/503 |
| | | | 228/111.5 |
| 2015/0207133 A1* | 7/2015 | Holl | H01M 50/581 |
| | | | 429/61 |
| 2015/0229011 A1 | 8/2015 | Gless | |
| 2016/0190663 A1* | 6/2016 | Bahrami | H01M 10/613 |
| | | | 429/120 |
| 2019/0036283 A1* | 1/2019 | Jordan | H01R 25/162 |
| 2019/0074557 A1* | 3/2019 | Shin | H01M 10/6553 |
| 2020/0152948 A1 | 5/2020 | Wynn et al. | |
| 2020/0295336 A1* | 9/2020 | Tallman | H01M 50/543 |
| 2020/0358146 A1* | 11/2020 | Ahn | H01M 10/48 |
| 2020/0358278 A1* | 11/2020 | Agnaou | H02B 1/305 |
| 2021/0075074 A1* | 3/2021 | Kadirvel | H01M 50/256 |
| 2021/0218237 A1* | 7/2021 | Dube | H02G 5/10 |
| 2021/0408514 A1* | 12/2021 | Sohag | H01M 10/613 |
| 2022/0037871 A1* | 2/2022 | Hoffmann | H02G 5/10 |
| 2022/0158149 A1 | 5/2022 | Schwarzwalder et al. | |
| 2023/0261330 A1* | 8/2023 | Dietze | H01M 50/204 |
| | | | 429/158 |
| 2023/0318147 A1* | 10/2023 | Jacobs | H01M 50/503 |
| | | | 429/158 |
| 2023/0345681 A1* | 10/2023 | Sinopoli | H05K 7/20909 |
| 2024/0120572 A1* | 4/2024 | Fernandez-Galindo | H01M 50/591 |
| 2024/0145884 A1* | 5/2024 | Wu | H01M 50/51 |
| 2025/0023182 A1* | 1/2025 | Wu | H01M 10/486 |

FOREIGN PATENT DOCUMENTS

| | | | | |
|---|---|---|---|---|
| CN | 204464415 U | * | 7/2015 | |
| CN | 204732499 U | * | 10/2015 | |
| CN | 210628397 U | * | 5/2020 | |
| CN | 216529247 U | * | 5/2022 | H01M 50/204 |
| DE | 102011002659 A1 | * | 7/2012 | H01M 2/345 |
| DE | 102012213100 A1 | | 1/2014 | |
| DE | 102012215058 A1 | * | 2/2014 | H01M 2/1235 |
| DE | 102013017397 A1 | * | 4/2015 | H01M 50/119 |
| DE | 102014214310 A1 | * | 1/2016 | H01M 50/583 |
| DE | 102019127039 A1 | * | 4/2020 | H01R 4/48 |
| DE | 102021107347 A1 | * | 12/2021 | H01M 10/625 |
| JP | 2012099573 A | * | 5/2012 | |
| WO | WO-2023038396 A1 | * | 3/2023 | H01M 50/284 |

\* cited by examiner

THERMALLY CONDUCTING BRACKET FOR BUSBAR TO COLD PLATE HEAT TRANSFER

INTRODUCTION

The present disclosure relates to thermal pathways sufficient for providing direct heat transfer from one component to another, such as but not necessarily limited to a bracket configured to transfer heat in a vehicle battery system from a busbar to a cold plate.

Devices may generate heat when operating such that it may be desirable to transfer the heat from one component to another component in an effort to mitigate an influence of the heat. A vehicle relying upon an electric motor to provide tractive force is one example of a device that can benefit from the use of a thermal pathway to transfer heat from one component to another, such as to transfer heat from an electrical distribution system to a cold plate or other type of heat sink. The transference of heat from the electrical distribution system to the cold plate can be beneficial as the electrical distribution system may generate heat under certain circumstances and challenging as it may be desirable to establish the thermal pathway in an electrically isolative manner due to the relatively high operating voltage of the busbar, particularly during a thermal runaway event or other high temperature situation where more extreme temperatures may limit capabilities of some materials to maintain electrical isolation.

SUMMARY

Disclosed herein is a bracket configured for use in a vehicle or other device to provide a thermal pathway in an electrically isolative manner for direct heat transfer between a busbar and a cold plate. The bracket may be configured to provide a physical route between the busbar and the cold plate that may be selectively severed to prevent short circuits or other breakdown of electrical isolation when a temperature of the bracket surpasses a temperature threshold.

One non-limiting aspect of the present disclosure relates to a thermally conductive bracket for use in a vehicle to transfer heat from a busbar to a cold plate configured acts as a heat sink for a plurality of battery cells connected to the busbar. The bracket may include a thermally conductive heat transfer material shaped to receive the busbar where at least a portion of the material may be configured to include opposed sides and a bottom such that the opposed sides transfer heat from the busbar to the bottom and the bottom transferring heat from the sides to the cold plate. The bracket may include one or more heat actuated clasps configured to actuate from a latched position to an unlatched position in response to surpassing a temperature threshold. The clasps may be configured in the latched position for restraining the sides against the busbar and in the unlatched position for releasing the sides to expand away from the busbar.

The sides and bottom may include a thermally expansive material configured to produce an expansion when heated to the temperature threshold whereby the expansion actuates the clasps from the latched position to the unlatched position.

The clasps may each include a hook attached to one of the sides and a catch attached to the other one of the sides whereby the hook may be configured to hold the catch when the clasps are in the latched position and to disengage the catch when the clasps are in the unlatched position.

The hook and the catch may cooperate to generate a compressive force sufficient to pull the sides toward the busbar when the clasps are in the latched position.

The compressive force may be proportional to a retainment force between the hook and the catch when the clasps are in the latched position.

The retainment force may be generated between a detent on an underside of the hook and another detent on a topside of the catch.

The clasps may actuate from the latched position to the unlatched position in response to the expansion exceeding the retainment force.

The sides may be shaped to receive the busbar such that an underside of the busbar is offset from the bottom of the trough to correspondingly define a gap between the underside of the busbar and a topside of the bottom.

The offset may be sufficient to prevent the bottom from contacting the busbar when the clasps are in either of the latched and the unlatched positions.

The sides and bottom may be comprised at least partially of a copper layer and an aluminum layer where the copper and aluminum layers producing an expansion when heated to the temperature threshold such that the expansion actuates the clasps from the latched position to the unlatched position.

The bracket may include a glue layer configured to adhere the sides to the busbar and a PET film layer configured to facilitate electrical isolation.

The glue layer may be adhered to the PET layer, the PET layer may be adhered to the aluminum layer, and the aluminum layer may be adhered to the copper layer.

One non-limiting aspect of the present disclosure relates to a system for transferring heat away from a battery pack configured to power a traction motor of a vehicle. The system may include a busbar configured to electrically connect a plurality of battery cells of the battery pack, a cold plate configured to act as a heat sink for the battery cells, and a heat actuated bracket configured to provide a direct heat transfer path from the busbar to the cold plate when a temperature of the bracket fails to surpass a threshold and to sever the direct heat transfer path when the temperature surpasses the threshold.

The bracket may be configured to actuate from a latched position to an unlatched position in response to the temperature surpassing the threshold such that the latched position provides the direct heat transfer path and the unlatched position severs the direct heat transfer path.

The bracket may suffer a deformation when actuating from the latched position to the unlatched position, optionally with the deformation preventing the bracket from returning to the latched position.

The bracket may be at least partially comprised of a thermally expansive material configured to produce an expansion when heated to the temperature threshold such that the expansion heat actuates the bracket from the latched position to the unlatched position.

The bracket may include one or more heat actuated clasps configured in a latched position to restrain sides of the bracket against the busbar and configured in an unlatched position to release the sides to expand away from the busbar, optionally the clasps may be configured to heat actuate from the latched position to the unlatched position in response to the temperature surpassing the threshold.

One non-limiting aspect of the present disclosure relates to a bracket for use in a vehicle to transfer heat from a busbar to a cold plate. The bracket may include a thermally conductive and thermally expansive metallic material shaped to provide a thermal pathway between opposed sides configured to contact the busbar and a bottom configured to contact the cold plate, optionally with the material being configured to experience an expansion when heated above a threshold whereupon the expansion separates the sides from the busbar to sever the thermal pathway.

The sides and bottom may be comprised at least partially of a first metallic layer and a second metallic layer, optionally with the first and second layers having disparate expansion properties and being configured to produce the expansion when heated to the threshold.

The bracket may include one or more heat actuated clasps configured in a latched position to restrain sides of the bracket against the busbar and configured in an unlatched position to release the sides to expand away from the busbar, optionally with the clasps being configured to heat actuate from the latched position to the unlatched position in response to the temperature surpassing the threshold.

The above features and advantages and other features and advantages of the present teachings are readily apparent from the following detailed description of the modes for carrying out the present teachings when taken in connection with the accompanying drawings. It should be understood that even though the following Figures embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
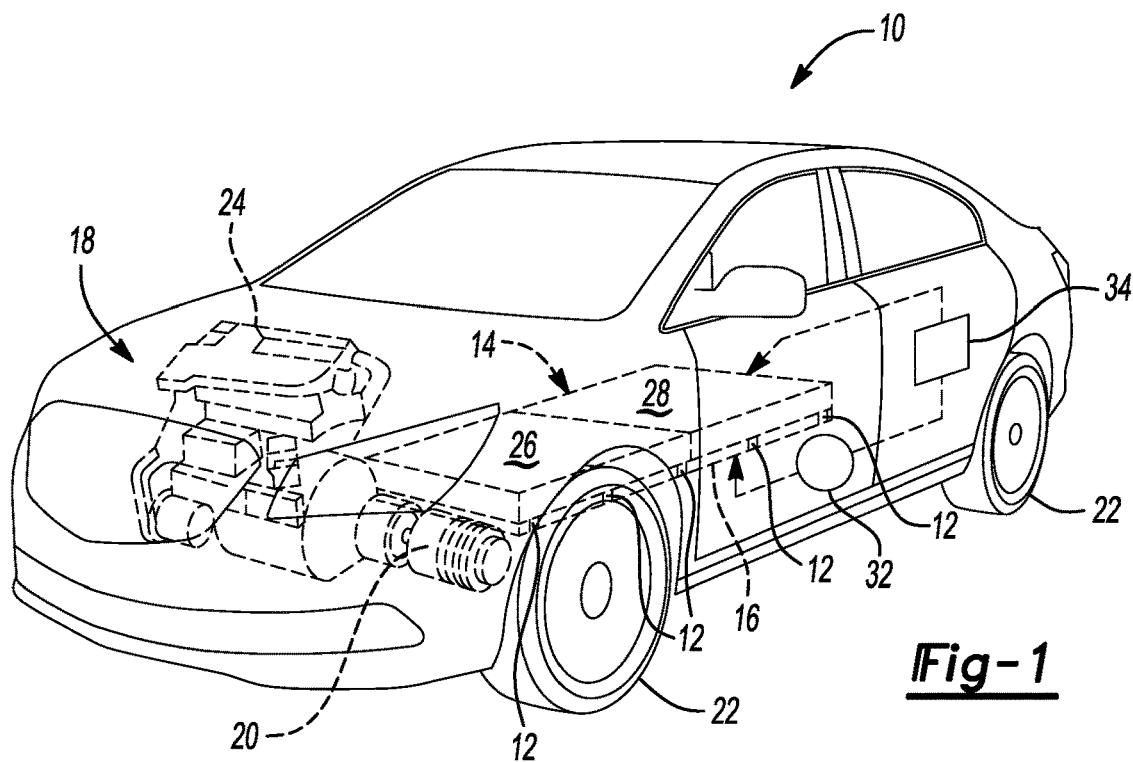
FIG. 1 schematically illustrates an electric vehicle having a plurality of brackets in accordance with one non-limiting aspect of the present disclosure.

FIG. 1 schematically illustrates an electric vehicle 10 having a plurality of brackets 12 configured to provide a thermal pathway between an electrical distribution system 14 and a cold plate 16 in accordance with one non-limiting aspect of the present disclosure. The vehicle 10 may include a powertrain 18 configured with an electric motor 20 to provide tractive force to one or more wheels 22 in response to electrical energy from the electrical distribution system 14. The powertrain 18 may optionally operate in cooperation with an internal combustion engine 24. The electrical distribution system 14 is illustrated as a battery pack for exemplary purposes as having a high voltage configuration constructed from one or more battery modules 26, 28. Those of ordinary skill in the art will appreciate that the battery pack 14 and/or one or more battery modules 26, 28 may be used as an onboard power supply in other applications and for other purposes whereby use of the brackets 12 may be beneficial, e.g., for instance aboard other types of vehicles such as but not limited to aircraft, watercraft, or rail vehicles, or in non-vehicular applications such as powerplants, hoists, mobile platforms, robots, and the like.

The cold plate 16 may be configured as a heat sink or other component arranged adjacent to or along a major surface of the battery modules 26, 28. While the cold plate 16 is depicted in a typical configuration in which the heat sink is the cold plate 16 and is coextensive with an underside or bottom of the battery modules 26, 28, the actual location of the relevant heat sink may vary in other applications. In addition, the battery pack 14 may have a relatively flat shape, as shown, of a number of possible external shapes or aspect ratios, including the depicted rectangular shape. Such a low-profile configuration may be suitable for reducing packaging space in certain embodiments of the motor vehicle 10. As will be appreciated by those of ordinary skill in the art, battery cooling functions aboard the motor vehicle 10 and other systems equipped with the powertrain 18 may route battery coolant through and/or around the individual battery modules 26, 28 via a network of cooling pipes with the assistance of fans, pumps, valves, chillers, radiators, and other components.

The battery pack 14 may employ a lithium-ion, nickel-metal hydride, or other application-suitable high-energy battery chemistry. By way of example and not limitation, the battery pack 14 may include foil pouch-, or can-style battery cells arranged in a cell stack and electrically connected to provide output voltage at a level sufficient for energizing the electric machine 20, e.g., 300 VDC or more, or 60 VDC or more in certain propulsion operations. Thus, "high-voltage" may have different meanings in different embodiments, with "high-voltage" generally entailing voltage levels in excess of the typical 12-15 VDC commonly employed for auxiliary/low-voltage devices.

The cold plate 16 may be configured to operate in cooperation with a coolant pump 32 configured to circulate battery coolant to and from the cold plate 16 and possibly through the battery modules 26, 28. The heat transfer fluid may then be passed out of the battery pack 14 through a chiller 34 to help cool the battery pack 14, with the reverse operation likewise possible when warming of the battery pack 14 is required. While associated power electronics are omitted from for illustrative simplicity, such components typically include a power inverter module using pulse-width modulation (PWM)-controlled semiconductor switches to invert a DC voltage from the battery pack 14 into an alternating current voltage (VAC) for powering the electric machine 14, a DC-DC converter or auxiliary power module for reducing the voltage level from the battery pack 14 to auxiliary (e.g., 12-15 VDC) levels sufficient for powering auxiliary electrical systems aboard the vehicle 10.

Figure 2:
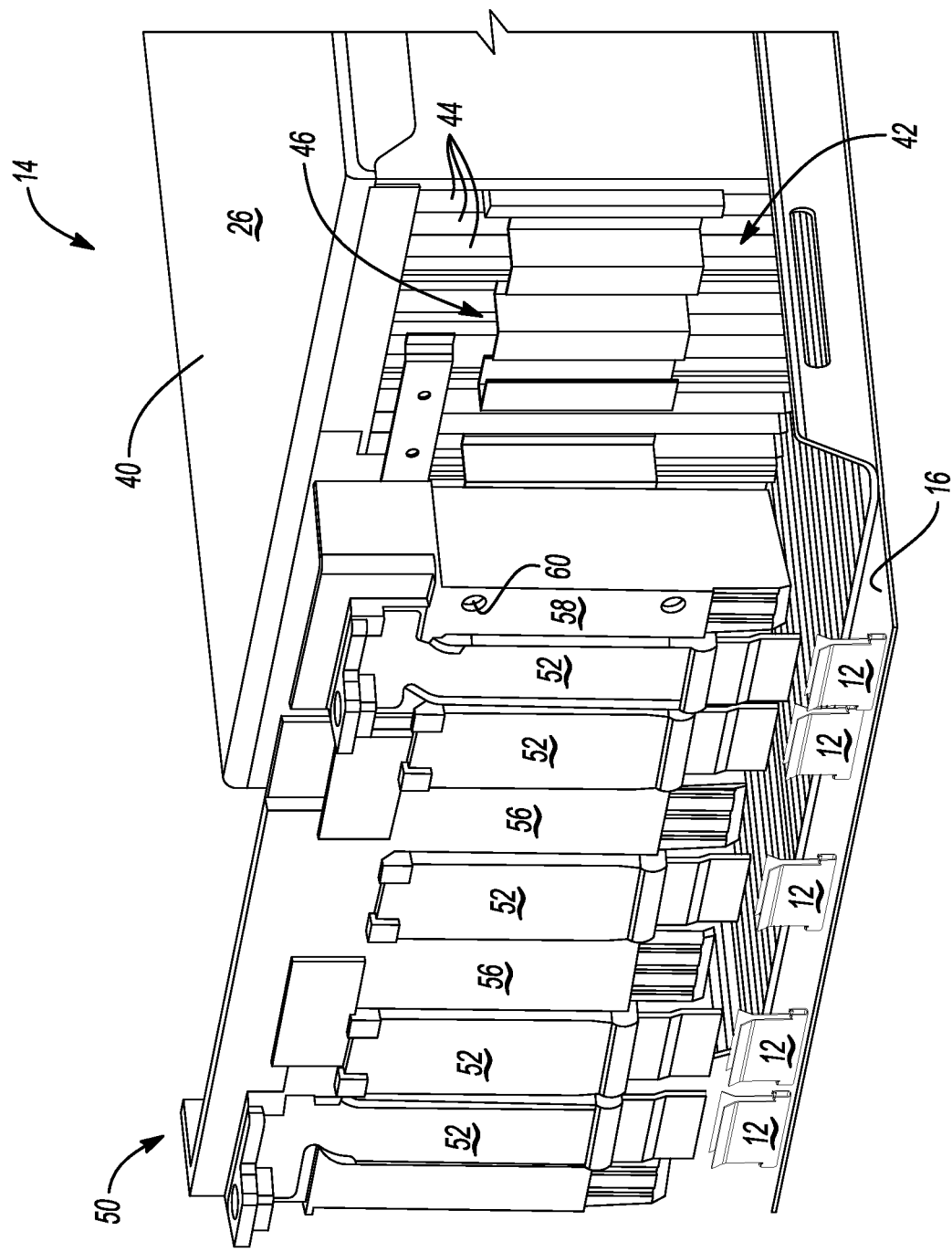
FIG. 2 a partially exploded, perspective view of a portion of a battery pack having a plurality of brackets in accordance with one non-limiting aspect of the present disclosure.

FIG. 2 a partially exploded, perspective view of a portion of the battery pack 14 having a plurality of brackets 12 configured to provide thermal pathways for heat transfer between the battery module 26 and the cold plate 16. The battery module 26 is shown for exemplary purposes with an external dust cover and internal mounting board removed for illustrative clarity. The battery module 26 may include an outer enclosure or housing 40 within which may be disposed a cell stack 42. The cell stack 42 may include a plurality of battery cells 44 such that the battery cells 44 may be stacked or otherwise purposefully arranged within the housing 40, which in turn may have nominal top, bottom, and side walls for a given orientation. Each respective battery cell 44 may include a pair of cell tabs 46 forming separate cathode and anode electrode extensions of the respective battery cell 44, e.g., at opposing ends of the battery cells 44 in the illustrated configuration.

The battery module 26 may include an interconnect board assembly (ICBA) 50 as an integral part of its construction. The ICBA 50 may include a parallel plurality of conductive busbars 52 cooperating to form a high-voltage bus. The busbars 52 may be optionally embodied as elongated metal plates having longitudinal axes with the collective set of busbars 52 being mutually parallel. The busbars 52 may be constructed from a suitable electrically conductive material, e.g., copper and/or aluminum. Optionally, the busbars 52 may be plated with a thin layer of nickel, tin, or another application-suitable element to facilitate welding and provide other possible performance benefits such as improved wear and tear, corrosion resistance, etc. Ultimately, the busbars 52 may be conductively joined to a respective one of the battery cells 44 via the cell tabs 46 thereof, e.g., via laser welding, ultrasonic welding, or another suitable conductive joint process, as will be appreciated by those of ordinary skill in the art.

The ICBA 50 may include a flexible or rigid interconnect board (ICB) 56 constructed from a suitable dielectric/electrically non-conductive material. Mounting flanges 58 with corresponding mounting holes 60 may be included as part of the ICB 56 to enable secure mounting of the ICBA 50 to the battery module 26. The cold plate 16 may be arranged along an outer surface of the battery module 26 and configured to conduct battery coolant therethrough. An internal coolant manifold construction of the cold plate 16 is believed to be well understood in the art and, accordingly, is not described further herein for illustrative simplicity. In embodiments in which cold plate 16 is not available nearby, other heat sinks may be used in place thereof and/or the brackets 12 may be shaped differently to establish the thermal pathways therewith. During connection or racking of the ICBA 50 to the remainder of the battery module 26, each bracket 12 may be received therein and engage one of the busbars 52. Multiple direct parallel thermal pathway or cooling paths may thereby be formed between the busbars 52 and the cold plate 16 or other relevant heat sink to facilitate cooling of the busbars 52 and the cell tabs 46 connected thereto.

Figure 3:
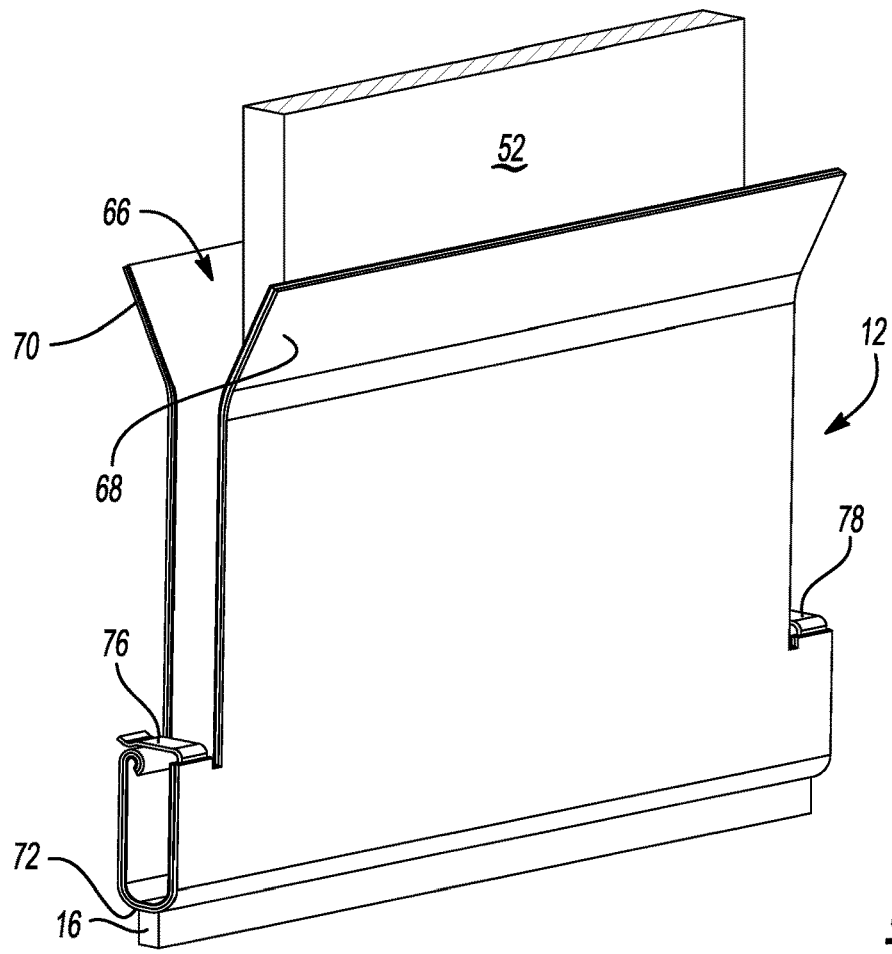
FIG. 3 schematically illustrates an assembly view of a bracket in accordance with one non-limiting aspect of the present disclosure.

FIG. 3 schematically illustrates an assembly view of the bracket 12 interconnecting with the busbars 52 in accordance with one non-limiting aspect of the present disclosure. The bracket 12 may include a thermally conductive heat transfer material shaped through stamping, molding, folding or other processes into the illustrated u-shaped, pocket or trough 66. At least a portion of the material may be configured to include opposed sides 68, 70 and a bottom 72 where the opposed sides 68, 70 may be configured to transfer heat from the busbar 52 to the bottom 72 whereupon the bottom 72 may be configured to thereafter transfer the heat to the cold plate 16, i.e., to provide a mechanical, thermal pathway between the busbar 52 and the cold plate 16. The cold plate 16 may be brazed, welded, or otherwise physically attached to the bottom 72 of the bracket 12. This physical attachment may be beneficial in establishing a direct, physical connection between the bracket 12 and the cold plate 16, which when coupled with the thermally conductivity of the bracket may be beneficial in maximizing the heat transfer properties of the thermal pathway.

The bracket 12 may include one or more clasps 76, 78 configured to assemble or attach the bracket 12 to the busbar 52 in a reliable manner such that the sides 68, 70 press against or are otherwise physically in contact with the busbar 52 in a thermally conductive manner. The clasps 76, 78 are shown for illustrative purposes as an exemplary configuration whereby of the bracket 12 may be held in contact with the busbar 52 and thereafter automatically disengaged in response to a triggering event. One such triggering event may correspond with a heating event whereby a temperature of the bracket 12, the busbar 52, the clasps 76, 78, or an ambient environment nearby surpasses a temperature threshold. The temperature threshold may be associated with a precursor to a thermal runaway condition or other predetermined state whereafter it may be desirable to disconnect the bracket 12 from the busbar 52. This severing of the thermal pathway may be undertaken to create an open-circuit condition sufficient to separate the bracket 12 from the busbar 52 so that non-arcing current cannot pass therebetween.

Figure 5:
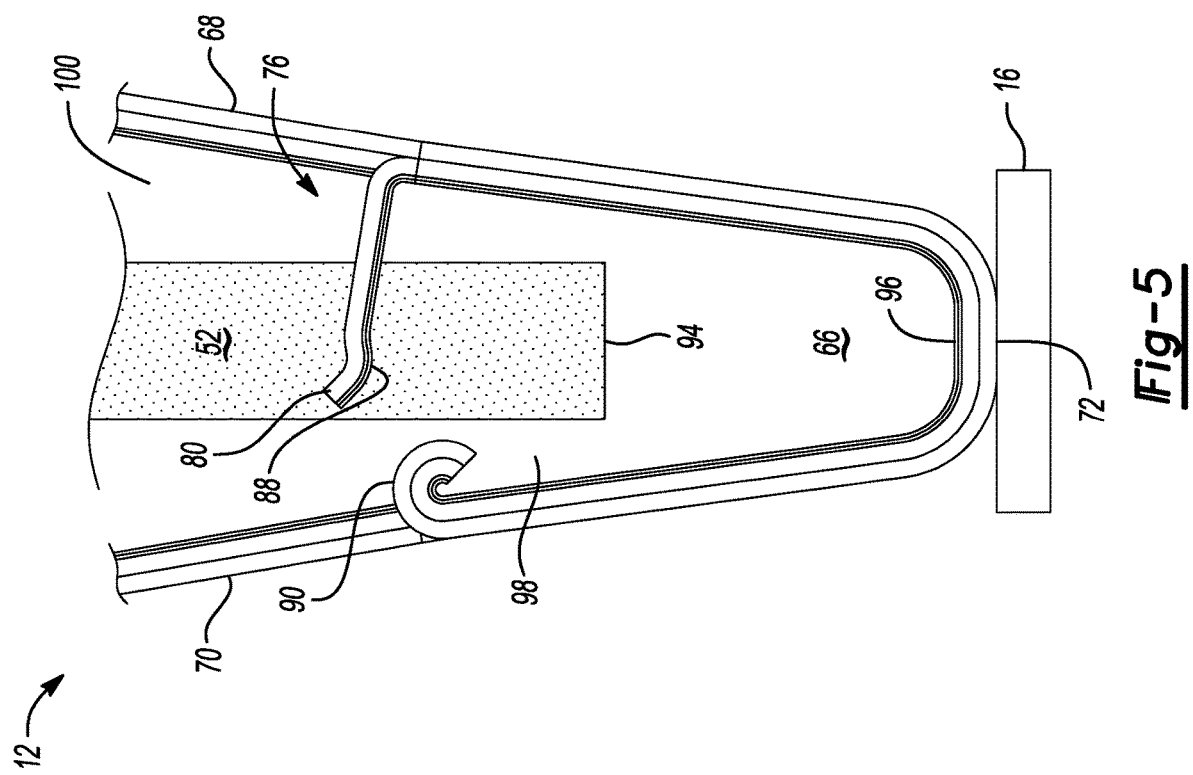
FIGS. 4-5 schematically illustrate operation of a bracket in accordance with one non-limiting aspect of the present disclosure.
Figure 4:
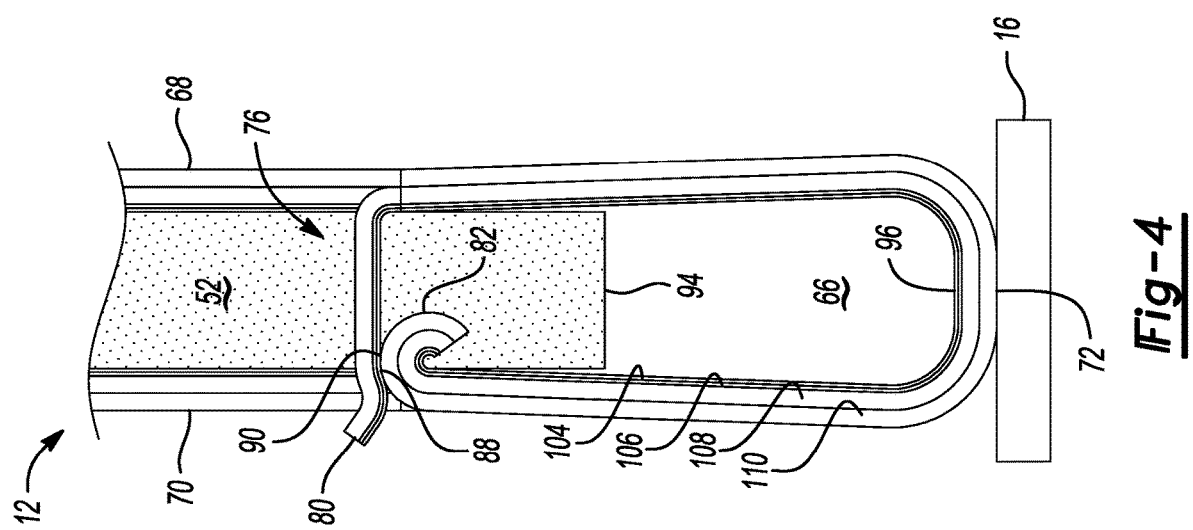

FIGS. 4-5 schematically illustrates operation of the clasps 76, 78 in accordance with one non-limiting aspect of the present disclosure. FIG. 4 illustrates the clasps 76 in closed or latched position whereby the clasps 76 is configured to restrain the sides 68, 70 against the busbar 52. FIG. 5 illustrates the clasps 76 in an opened or unlatched position whereby the sides 68, 70 are released or unrestrained relative to the busbar 52. The actuation of the bracket 12 from the latched position of FIG. 4 to the unlatched position of FIG. 5 may be characterized as a heat-activated articulation whereby the bracket 12 opens automatically in response to passing the temperature threshold. The capability of the bracket 12 to open automatically in response to temperature may be beneficial in enabling the present disclosure to provide a fuse-like operation whereby the busbar 52 may be mechanically separated from the bracket 12, and thereby the cold plate 16, at a desired temperature threshold. Such a measure may be useful in assuring electrical isolation during a thermal runaway event or other high-temperature situation.

The actuation from the latched to the unlatched position may occur automatically as a result of a material comprising the bracket 12 expanding when heated. The bracket 12 material may be selected according to electrical conductivity and thermal expansion characteristics to enable maximum thermal conduction with the cold plate 16 while also inducing an expansion at a predetermined temperature sufficient for disengaging the bracket 12 from the busbar 52. The clasp 76 may include a hook 80 attached to one of the sides 68 and a catch 82 attached to the other one of the sides 70. The hook 80 may be configured to hold the catch 82 when in the latched position (FIG. 4) and to disengage the catch 82 when in the unlatched position (FIG. 5). The hook 80 and the catch 82 may cooperate to generate a compressive force sufficient to pull the sides 68, 70 toward the busbar 52 when in the latched position, which may optionally be assisted with mechanically biasing induced during shaping of the bracket 12 during manufacture The compressive force provided with the latched clasp 76 may be proportional to a retainment force between the hook 80 and the catch 82. The retainment force may be generated between a detent 88 on an underside of the hook 80 and another detent 90 on a topside of the catch 82. The hook 80 may be retained in this manner based at least partially on a frictional engagement therebetween, additional interaction resulting from the detents 88, 90 having the exemplary arcuate shaping, a folding of the hook 80 pressing down on the catch 82, and/or other design parameters sufficient to permit the bracket 12 to selectively engage and disengage the busbar 52. The retainment force between the hook 80 and the catch 82 may be sufficient for the expansion of the bracket 12 under certain circumstances, such as in the event the bracket 12 is heated but the heating is insufficient to cause expansion beyond the grip of the hook 80. Once the expansion exceeds the retainment force or otherwise alters the engagement between the hook 80 in the catch 82, the bracket 12 may automatically articulate from the latched to the unlatched position.

The sides 68, 70 may be shaped to receive the busbar 52 such that an underside 94 of the busbar 52 may be offset from the bottom 72 of the trough 66. The offset may correspondingly define a gap between the underside 94 and a topside 96 of the bottom 72 whereby the offset may be sufficient to prevent the bottom 72 from contacting the busbar 52 when the clasp 76 is in either of the latched and the unlatched positions. The material characteristics and shaping of the bracket 12 may be configured to produce additional gaps 98, 100 between the sides 68, 70 and the busbar 52 when in the unlatched position. The gaps 98, 100 may be non-existent when in the latched position, i.e., there may be no gap of separation between the sides 68, 70 and the busbar 52, such that the gaps 98, 100 are beneficially created in unlatched position to maximize electrical isolation between the bracket 12 and the busbar 52.

The bracket 12 may include other types of configurations, such as a tab, and comprise various materials. The bracket is shown to be comprised predominately of a glue layer 104, an electrically isolating layer 106, e.g., polyethylene terephthalate (PET) or the like, an aluminum layer 108, and a copper layer 110. The aluminum and copper layers 108, 110 may be primarily responsible for producing the expansion when heated to the temperature threshold. The copper and aluminum layers 108, 110 may be selective to provide a bi-metallic configuration whereby the metallic characteristics provide excellent thermal conductivity and sufficient thermal expansion. The aluminum and copper layers 108, 110 may have disparate expansion properties such that the aluminum layer 108 expands more/faster than the copper layer 110. The glue layer 104 may be configured to assist in adhering the bracket to the busbar 52, and the isolation layer may be configured to facilitate electrical isolation. The bracket 12 may suffer a deformation when actuating from the latched position to the unlatched position due to the heating altering its materials properties, which may prevent returning to the latched position until overcome with reshaping.

The ability to maintain the bracket 12 in the unlatched position, i.e., with the gaps 98, 100 between the busbar 52, may be beneficial in preventing electrical conductivity between the busbar 52 and the cold plate 16 during thermal runaway or other high temperature conditions. The hook 80 may be shaped in the illustrated manner such that it may abut the catch 82 and/or drop below the catch 82 such that the hook 80 effectively prevents the bracket 12 from closing again, at least until lifted or otherwise manipulated by an operator. Even when abutting the catch 82 or the side 70, i.e., before the detents 88, 90 are properly seated, the gaps 98, 100 may persist. This gap persistence may be useful in providing an additional mechanism to assistant in maintaining electrical isolation. The clasps 76, 78 are shown for illustrative purposes as the present disclosure full contemplates its use and application with other types of connection mechanisms. Such additional mechanisms may include a key-way type of connection where a key may be used to hold the bracket 12 in position until actuated to the unlatched position whereafter the key may be similarly configured to ameliorate the bracket 12 closing again or otherwise reestablishing contact with the busbar 52.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A thermally conductive bracket for use in a vehicle to transfer heat from a busbar to a cold plate, the cold plate acting as a heat sink for a plurality of battery cells connected to the busbar, the bracket comprising:

a thermally conductive heat transfer material shaped to receive the busbar, wherein at least a portion of the material is configured to include opposed sides and a bottom, the opposed sides transferring heat from the busbar to the bottom and the bottom transferring heat from the sides to the cold plate; and one or more heat actuated clasps configured to actuate from a latched position to an unlatched position in response to surpassing a temperature threshold, the clasps in the latched position restraining the sides against the busbar and in the unlatched position releasing the sides to expand away from the busbar, wherein the sides and bottom are comprised at least partially of a copper layer and an aluminum layer, the copper and aluminum layers producing an expansion when heated to the temperature threshold, the expansion actuating the clasps from the latched position to the unlatched position.

2. The bracket of claim 1 wherein at least a portion of the sides and bottom includes a thermally expansive material configured to produce an expansion when heated to the temperature threshold, the expansion actuating the clasps from the latched position to the unlatched position.

3. The bracket of claim 2 wherein the clasps each include a hook attached to one of the sides and a catch attached to the other one of the sides, the hook configured to hold the catch when the clasps are in the latched position and to disengage the catch when the clasps are in the unlatched position.

4. The bracket of claim 3 wherein the hook and the catch cooperate to generate a compressive force sufficient to pull the sides toward the busbar when the clasps are in the latched position.

5. The bracket of claim 4 wherein the compressive force is proportional to a retainment force between the hook and the catch when the clasps are in the latched position.

6. The bracket of claim 5 wherein the retainment force is generated between a detent on an underside of the hook and another detent on a topside of the catch.

7. The bracket of claim 5 wherein the clasps actuate from the latched position to the unlatched position in response to the expansion exceeding the retainment force.

8. The bracket of claim 3 wherein the sides are shaped to receive the busbar such that an underside of the busbar is offset from the bottom of the trough, the offset correspondingly defining a gap between the underside of the busbar and a topside of the bottom.

9. The bracket of claim 8 wherein the offset is sufficient to prevent the bottom from contacting the busbar when the clasps are in either of the latched and the unlatched positions.

10. The bracket of claim 1 further comprising a glue layer configured to adhere the sides to the busbar and a PET film layer configured to facilitate electrical isolation.

11. The bracket of claim 10 wherein the glue layer is adhered to the PET layer, the PET layer is adhered to the aluminum layer, and the aluminum layer is adhered to the copper layer.

12. A system for transferring heat away from a battery pack configured to power a traction motor of vehicle, the system comprising:

a busbar configured to electrically connect a plurality of battery cells of the battery pack;
a cold plate configured to act as a heat sink for the battery cells; and
a heat actuated bracket configured to provide a direct heat transfer path from the busbar to the cold plate when a temperature of the bracket fails to surpass a threshold and to sever the direct heat transfer path when the temperature surpasses the threshold;
wherein the bracket includes one or more heat actuated clasps configured in a latched position to restrain sides of the bracket against the busbar and configured in an unlatched position to release the sides to expand away from the busbar, the clasps being configured to heat actuate from the latched position to the unlatched position in response to the temperature surpassing the threshold, wherein the clasps each include a hook attached to one of the sides and a catch attached to the other one of the sides, the hook configured to hold the catch when the clasps are in the latched position and to disengage the catch when the clasps are in the unlatched position.

13. The system of claim 12 wherein the bracket is configured to actuate from a latched position to an unlatched position in response to the temperature surpassing the threshold, the latched position providing the direct heat transfer path and the unlatched position severing the direct heat transfer path.

14. The system of claim 13 wherein the bracket suffers a deformation when actuating from the latched position to the unlatched position, the deformation preventing the bracket from returning to the latched position.

15. The system of claim 13 wherein the bracket is at least partially comprised of a thermally expansive material configured to produce an expansion when heated to the temperature threshold, the expansion heat actuating the bracket from the latched position to the unlatched position.

16. A bracket for use in a vehicle to transfer heat from a busbar to a cold plate, the bracket comprising:

a thermally conductive and thermally expansive metallic material shaped to provide a thermal pathway between opposed sides configured to contact the busbar and a bottom configured to contact the cold plate, wherein the material is configured to experience an expansion when heated above a threshold whereupon the expansion separates the sides from the busbar to sever the thermal pathway, wherein the sides and bottom are comprised at least partially of a first metallic layer and a second metallic layer, the first and second layers having disparate expansion properties and being configured to produce the expansion when heated to the threshold.

17. The bracket of claim 16 further comprising one or more heat actuated clasps configured in a latched position to restrain sides of the bracket against the busbar and configured in an unlatched position to release the sides to expand away from the busbar, the clasps being configured to heat actuate from the latched position to the unlatched position in response to the temperature surpassing the threshold.

* * * * *